United States Patent
Tanaka et al.

(10) Patent No.: US 9,012,549 B2
(45) Date of Patent: Apr. 21, 2015

(54) ADHESIVE COMPOSITION, ADHESIVE LAYER AND ADHESIVE SHEET

(75) Inventors: Akiko Tanaka, Osaka (JP); Yutaka Moroishi, Osaka (JP); Fumiko Nakano, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 13/814,696

(22) PCT Filed: Aug. 9, 2011

(86) PCT No.: PCT/JP2011/068173
§ 371 (c)(1),
(2), (4) Date: Feb. 6, 2013

(87) PCT Pub. No.: WO2012/020764
PCT Pub. Date: Feb. 16, 2012

(65) Prior Publication Data
US 2013/0143999 A1    Jun. 6, 2013

(30) Foreign Application Priority Data

Aug. 12, 2010 (JP) ................................ 2010-180960

(51) Int. Cl.
*C09J 133/10* (2006.01)
*C09J 133/06* (2006.01)
*C09J 133/08* (2006.01)
*C09J 7/02* (2006.01)
*C08K 3/22* (2006.01)
*C08F 220/18* (2006.01)
*C09J 151/00* (2006.01)
*C09J 125/06* (2006.01)
*C08K 7/00* (2006.01)

(52) U.S. Cl.
CPC .............. *C09J 133/10* (2013.01); *C08F 220/18* (2013.01); *C09J 133/066* (2013.01); *C09J 151/003* (2013.01); *C08F 2220/1825* (2013.01); *C09J 7/021* (2013.01); *C08K 7/00* (2013.01); *C08K 2003/2237* (2013.01); *C09J 2205/102* (2013.01); *C09J 2433/00* (2013.01); *C09J 2451/00* (2013.01); *C09J 125/06* (2013.01); *C08K 2201/011* (2013.01); *C09J 2203/318* (2013.01); *C09J 2425/00* (2013.01)

(58) Field of Classification Search
CPC ...... C09J 133/06; C09J 133/08; C09J 133/10; C09J 2425/00; C09J 7/00; C09J 7/0207; C08K 2003/2237; C01P 2004/64; C01P 2006/60

USPC ........ 524/413, 497, 504, 523; 428/40.1, 343; 525/69, 80, 85
See application file for complete search history.

(56) References Cited

U.S. PATENT DOCUMENTS

| | | | |
|---|---|---|---|
| 5,382,604 A * | 1/1995 | Erickson ..................... 522/158 |
| 5,981,666 A * | 11/1999 | Zajaczkowski et al. ...... 525/296 |
| 6,416,838 B1 | 7/2002 | Arney et al. |
| 6,663,978 B1 | 12/2003 | Olson et al. |
| 2002/0098352 A1 | 7/2002 | Kishioka |
| 2004/0091729 A1 | 5/2004 | Olson et al. |
| 2005/0202196 A1* | 9/2005 | Katoh et al. ................. 428/40.1 |
| 2005/0272949 A1 | 12/2005 | Olson et al. |
| 2006/0028723 A1 | 2/2006 | Chen et al. |
| 2006/0121273 A1* | 6/2006 | Toyama et al. ............... 428/343 |
| 2007/0264517 A1 | 11/2007 | Olson et al. |
| 2009/0233093 A1 | 9/2009 | Toyama et al. |
| 2011/0070435 A1 | 3/2011 | Toyama et al. |
| 2011/0217542 A1* | 9/2011 | Moroishi et al. ............. 428/323 |

FOREIGN PATENT DOCUMENTS

| | | | |
|---|---|---|---|
| CN | 101531873 A | | 9/2009 |
| JP | 2002-173656 A | | 6/2002 |
| JP | 2003-513122 A | | 4/2003 |
| JP | 2003-342546 A | | 12/2003 |
| JP | 2005-213482 A | | 8/2005 |
| JP | 2005-255706 A | | 9/2005 |
| JP | 2005-301213 A | | 10/2005 |
| JP | 2006-342258 A | | 12/2006 |
| JP | 2008-63350 A | | 3/2008 |
| JP | 2010-43156 A | | 2/2010 |
| JP | 2010043156 A | * | 2/2010 |

OTHER PUBLICATIONS

International Search Report for PCT/JP2011/068173 dated Sep. 13, 2011.
PCT/IB/338, with attached International Preliminary Report on Patentability and Written Opinion, received in counterpart PCT/JP2011/068173.
Chinese Office Action issued in corresponding Chinese Patent Application No. 201180036272.1 dated May 19, 2014.
Taiwanese Office Action issued in corresponding Patent Application No. 100128975 dated Jan. 21, 2015.

* cited by examiner

*Primary Examiner* — Ling Choi
*Assistant Examiner* — Ronald Grinsted
(74) *Attorney, Agent, or Firm* — Sughrue Mion, PLLC

(57) ABSTRACT

Provided are: an adhesive composition that is capable of providing an adhesive layer in which titanium-based nanoparticles are stably dispersed, an adhesive layer having more enhanced mechanical characteristics, excellent refractive index and excellent adhesive force, and an adhesive sheet or the like which uses the adhesive composition.

8 Claims, No Drawings

ADHESIVE COMPOSITION, ADHESIVE LAYER AND ADHESIVE SHEET

CROSS REFERENCE TO RELATED APPLICATIONS

This application is a National Stage of International Application No. PCT/JP2011/068173 filed Aug. 9, 2011, claiming priority based on Japanese Patent Application No. 2010-180960 filed Aug. 12, 2010, the contents of all of which are incorporated herein by reference in their entirety.

TECHNICAL FIELD

The invention relates to an adhesive composition containing titanium-based nanoparticles used for a variety of applications, to an adhesive layer made from the adhesive composition, and to an adhesive sheet including a support and such an adhesive layer provided on at least one side of the support.

BACKGROUND ART

In conventional techniques, an adhesive composition including an acryl-based polymer is used to bond various optical films such as anti-reflection films and electrically-conductive films, to display panels such as liquid crystal display devices.

The refractive indices of materials commonly used to form optical films or optical components are typically as follows: about 1.52 for glass, about 1.51 for methacrylic resin, and about 1.60 for polycarbonate.

Unfortunately, after dried or cured, such a conventional adhesive composition has a refractive index of about 1.47. This causes a difference in refractive index at the interface between the adhesive layer and an optical film or an optical component, and due to the difference, total reflection of shallow-angle light can occur and reduce the light extraction efficiency.

Another conventional adhesive composition contains, as a main component, a product of copolymerization of an acryl-based polymer with an aromatic ring-containing copolymerizable monomer. Such a conventional adhesive composition has a refractive index higher than that of the above conventional acryl-based adhesive composition, but does not have well-balanced other properties.

Some efforts have been made to improve the physical properties of pressure-sensitive adhesives or polymer compositions, such as mechanical strength, by adding various fine particles to pressure-sensitive adhesives or polymer compositions used for a wide variety of applications. Methods commonly used include uniformly dispersing surface-treated fine particles in a composition or uniformly dispersing fine particles in a composition by a process using any of various dispersing machines.

For example, any of various silane coupling agents is added to a colloidal silica gel of 30 nm or less to modify the surface of the silica, and the modified silica gel is mixed with a polymer solution to form a pressure-sensitive adhesive, in which the fine particles reduce the volumetric shrinkage rate and thus should be effective in increasing the adhesive force (see Patent Document 1).

It is disclosed that a diffusion pressure-sensitive adhesive containing nanoparticles is provided to improve contrast or viewing angle (see Patent Document 2). Unfortunately, the document does not show any specific method for dispersion and stabilization.

A method of preparing an adhesive syrup is also disclosed, which includes subjecting metal oxide particles of 200 nm or less to a surface treatment with a long-chain aliphatic acid or an organosilane as a surface modifier and dispersing the modified particles in a monomer (see Patent Document 3).

An ultraviolet-blocking pressure-sensitive adhesive is also disclosed, which is a coating composition including a mixture of zinc oxide fine particles of 0.2 μm or less and an acryl-based polymer produced by copolymerization using a hydroxyl group-containing monomer in an organic solvent that does not produce any acid functional group (see Patent Document 4).

Unfortunately, when fine particles prepared using the surface treatment method are dispersed in various compositions, the fine particles can aggregate into a complex depending on the type of the polymer, which can produce cloudiness and a certain level of haze. Thus, the type of the solvent, the surface modifier, or the coupling agent must be changed as needed depending on the composition of the polymer. In fact, laborious screening is necessary, in which various examinations are performed for optimization. In some cases, there are associated problems such as impossibility to use general-purpose solvents.

There is also disclosed an adhesive composition containing a specific content of metal-based fine particles and an aromatic polymer including an aromatic ring-containing monomer component (see Patent Document 5).

Patent Document 1: JP-A-2005-255706
Patent Document 2: JP-A-2005-301213
Patent Document 3: JP-A-2003-513122
Patent Document 4: JP-A-2005-213482
Patent Document 5: JP-A-2010-43156

DISCLOSURE OF THE INVENTION

Problems to be Solved by the Invention

It is thus an object of the invention to provide an adhesive composition that contains stably dispersed titanium-based nanoparticles and can provide desired physical properties without undergoing a complicated process.

It is another object of the invention to provide an adhesive layer made from the adhesive composition and to provide an adhesive sheet having the adhesive layer.

Means for Solving the Problems

As a result of earnest studies to solve the problems, the inventors have found the adhesive composition described below and have completed the invention.

Specifically, the invention is directed to an adhesive composition, including:

100 parts by weight of a (meth)acryl-based polymer including, as a monomer component, 50% by weight or more of a (meth)acrylate represented by the formula $CH_2=C(R_1)COOR_2$, wherein $R_1$ represents hydrogen or a methyl group, and $R_2$ represents a substituted or unsubstituted alkyl group of 1 to 20 carbon atoms, having a weight average molecular weight of from 500,000 to 3,000,000 as determined by gel permeation chromatography, and being substantially free of an acid component;

120 to 400 parts by weight of an aromatic polymer including an aromatic ring-containing monomer having an unsaturated double bond-containing polymerizable functional group and an aromatic ring, the aromatic polymer having a weight average molecular weight of from 200 to 900 as determined by gel permeation chromatography; and 150 to 600 parts by weight of titanium-based nanoparticles having an average particle size of 100 nm or less.

In the adhesive composition, the (meth)acryl-based polymer is preferably a copolymer further including, as a monomer component, 0.05 to 10% by weight of a hydroxyl group-containing (meth)acrylate represented by the formula $CH_2=C(R_1)COOC_nH_{2n}OH$, wherein $R_1$ represents hydrogen or a methyl group, and n represents an integer of 1 to 10.

The adhesive composition preferably further contains 0.02 to 2 parts by weight of a crosslinking agent, based on 100 parts by weight of the (meth)acryl-based polymer.

In the adhesive composition, the (meth)acryl-based polymer is preferably a graft polymer having a backbone-forming main chain and a side chain different in composition from the backbone-forming main chain.

The invention is also directed to an adhesive layer including a product made from the adhesive composition according to any of the above aspects.

The adhesive layer preferably has a gel fraction of 40 to 90% by weight.

The adhesive layer preferably has a haze of 20% or less.

The invention is also directed to an adhesive sheet including a support and the adhesive layer according to any of the above aspects formed on at least one side of the support.

Effect of the Invention

The adhesive composition of the invention can be used in a wide variety of applications because it contains a relatively large amount of stably dispersed titanium-based nanoparticles, has higher mechanical characteristics, and has a high refractive index and a high adhesive force.

MODE FOR CARRYING OUT THE INVENTION

The adhesive composition of the invention for use on optical components contains, as a base polymer, a (meth)acryl-based polymer including 50% by weight or more of a monomer unit derived from a (meth)acrylate represented by the formula $CH_2=C(R_1)COOR_2$, wherein $R_1$ represents hydrogen or a methyl group, and $R_2$ represents a substituted or unsubstituted alkyl group of 1 to 20 carbon atoms, having a weight average molecular weight of from 500,000 to 3,000,000 as determined by gel permeation chromatography, and being substantially free of an acid component.

The substituted or unsubstituted alkyl group of 1 to 20 carbon atoms represented by $R_2$ is intended to include a straight or branched chain alkyl group or a cycloalkane group, which is a cyclic moiety. The substituent of the substituted alkyl group is preferably an aryl group of 3 to 8 carbon atoms or an aryloxy group of 3 to 8 carbon atoms. The aryl group is preferably, but not limited to, a phenyl group.

Examples of the monomer represented by the formula $CH_2=C(R_1)COOR_2$ include methyl (meth)acrylate, ethyl (meth)acrylate, n-butyl (meth)acrylate, sec-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-dodecyl (meth)acrylate, isomyristyl (meth)acrylate, n-tridecyl (meth)acrylate, n-tetradecyl (meth)acrylate, stearyl (meth)acrylate, isostearyl (meth)acrylate, phenoxyethyl (meth)acrylate, and benzyl (meth)acrylate. These may be used alone or in any combination.

In the invention, the content of the monomer represented by the formula $CH_2=C(R_1)COOR_2$ is 50% by weight or more, preferably from 50 to 98% by weight, based on the weight of all monomers in the (meth)acrylic polymer. In particular, the content of butyl (meth)acrylate is preferably 50% by weight or more, more preferably from 60 to 99.5% by weight, in view of polymerizability and the stability of dispersion of titanium-based nanoparticles.

In the invention, the (meth)acryl-based polymer may further include a hydroxyl group-containing monomer represented by the formula $CH_2=C(R_1)COOC_nH_{2n}OH$. Specifically, this monomer contains a hydroxyalkyl group having one or more carbon atoms and one hydroxyl group.

Examples of such a monomer include a hydroxyalkyl (meth)acrylate such as 2-hydroxybutyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, or 12-hydroxylauryl (meth)acrylate; and a hydroxyalkylcycloalkyl (meth)acrylate such as 4-hydroxymethylcyclohexyl (meth)acrylate.

The content of the hydroxyl group-containing monomer, if any, may be from 0.05 to 10% by weight, based on the total weight of all monomers in the (meth)acryl-based polymer. The content of the hydroxyl group-containing monomer is preferably from 0.05 to 5% by weight, more preferably from 0.1 to 1% by weight.

Any other copolymerizable monomer or monomers may be used alone or in combination to form a monomer component of the (meth)acryl-based polymer, as long as the objects of the invention are not hindered. In the invention, however, the (meth)acryl-based polymer is substantially free of an acid component. As used herein, the term "substantially free of an acid component" means that the polymer is completely free of an acid component or may contain at most less than 0.1% by weight of an acid component. Examples of such an acid component include, but are not limited to, a carboxylic acid-containing monomer and acrylic acid.

Examples of such other copolymerizable monomers that may be used include vinyl monomers such as vinyl acetate, vinyl propionate, styrene, α-methylstyrene, and N-vinylcaprolactam; epoxy group-containing monomers such as glycidyl (meth)acrylate, methylglycidyl (meth)acrylate, and 3,4-epoxycyclohexylmethyl (meth)acrylate; glycol acrylate monomers such as polyethylene glycol (meth)acrylate, polypropylene glycol (meth)acrylate, methoxyethylene glycol (meth)acrylate, and methoxypolypropylene glycol (meth)acrylate; acrylate monomers such as tetrahydrofurfuryl (meth)acrylate, fluoro(meth)acrylate, silicone (meth)acrylate, and 2-methoxyethyl acrylate; and amide group-containing monomers, amino group-containing monomers, imide group-containing monomers, N-acryloylmorpholine, and vinyl ether monomers.

A silane monomer containing a silicon atom may also be used. Examples of such a silane monomer include 3-acryloxypropyltriethoxysilane, vinyltrimethoxysilane, vinyltriethoxysilane, 4-vinylbutyltrimethoxysilane, 4-vinylbutyltriethoxysilane, 8-vinyloctyltrimethoxysilane, 8-vinyloctyltriethoxysilane, 10-methacryloyloxydecyltrimethoxysilane, 10-acryloyloxydecyltrimethoxysilane, 10-methacryloyloxydecyltriethoxysilane, and 10-acryloyloxydecyltriethoxysilane.

In the invention, the (meth)acryl-based polymer has a weight average molecular weight of 500,000 or more, preferably 600,000 or more. If the weight average molecular weight is less than 500,000, the adhesive layer may have low durability or low cohesive strength so that an adhesive deposit may be more likely to be formed. If the weight average molecular weight is more than 3,000,000, the bonding properties or the adhesive layer may be undesirably reduced. In this case, the adhesive composition may have too high viscosity in a solution system, so that it may be difficult to apply. The weight average molecular weight may refer to a polystyrene-equivalent weight average molecular weight measured and calculated using gel permeation chromatography (GPC).

The (meth)acryl-based polymer may be produced by any method appropriately selected from known production methods such as solution polymerization, bulk polymerization, emulsion polymerization, and various types of radical polymerization. The resulting (meth)acryl-based polymer may be any of a random copolymer, a block copolymer, and a graft copolymer.

In solution polymerization, for example, ethyl acetate, toluene, or the like may be used as a polymerization solvent. A specific example of solution polymerization includes performing the reaction under a stream of inert gas such as nitrogen in the presence of a polymerization initiator typically under the reaction conditions of a temperature of about 50 to about 70° C. and a time period of about 5 to about 30 hours.

Any appropriately selected polymerization initiator, chain transfer agent, emulsifier, or other agents may be used for radical polymerization. The weight average molecular weight of the (meth)acryl-based polymer can be adjusted by the amount of the polymerization initiator or the chain transfer agent or by reaction conditions. The amount of these materials may be adjusted as appropriate depending on the type of these materials.

Examples of the polymerization initiator include, but are not limited to, azo initiators such as 2,2'-azobisisobutyronitrile, 2,2'-azobis(2-amidinopropane)dihydrochloride, 2,2'-azobis[2-(5-methyl-2-imidazoline-2-yl)propane]dihydrochloride, 2,2'-azobis(2-methylpropionamidine)disulfate, 2,2'-azobis(N,N'-dimethyleneisobutylamidine), and 2,2'-azobis[N-(2-carboxyethyl)-2-methylpropionamidine]hydrate (VA-057 manufactured by Wako Pure Chemical Industries, Ltd.); persulfates such as potassium persulfate and ammonium persulfate; peroxide initiators such as di(2-ethylhexyl)peroxydicarbonate, di(4-tert-butylcyclohexyl)peroxydicarbonate, di-sec-butylperoxydicarbonate, tert-butylperoxyneodecanoate, tert-hexylperoxypivalate, tert-butylperoxypivalate, dilauroyl peroxide, di-n-octanoyl peroxide, 1,1,3,3-tetramethylbutylperoxy-2-ethyl hexanoate, di(4-methylbenzoyl)peroxide, dibenzoyl peroxide, tert-butylperoxyisobutyrate, 1,1-di(tert-hexylperoxy)cyclohexane, tert-butylhydroperoxide, and hydrogen peroxide; and a redox system initiator including a combination of a peroxide and a reducing agent, such as a combination of a persulfate and sodium hydrogen sulfite or a combination of a peroxide and sodium ascorbate.

The above polymerization initiators may be used alone or in combination of two or more. The total content of the polymerization initiator(s) is preferably from about 0.005 to about 1 part by weight, and more preferably from about 0.02 to about 0.5 parts by weight, based on 100 parts by weight of the monomers.

For example, when the (meth)acryl-based polymer having a weight average molecular weight as stated above is produced using 2,2'-azobisisobutyronitrile as a polymerization initiator, the amount of the polymerization initiator is preferably from about 0.06 to about 0.2 parts by weight, and more preferably from about 0.08 to about 0.175 parts by weight, based on 100 parts by weight of all monomers.

Examples of the chain transfer agent include lauryl mercaptan, glycidyl mercaptan, mercaptoacetic acid, 2-mercaptoethanol, thioglycolic acid, 2-ethylhexyl thioglycolate, and 2,3-dimercapto-1-propanol. The chain transfer agents may be used alone or in combination of two or more. The total content of the chain transfer agent(s) should be about 0.1 parts by weight or less, based on 100 parts by weight of all monomers.

Examples of the emulsifier for use in emulsion polymerization include anionic emulsifiers such as sodium lauryl sulfate, ammonium lauryl sulfate, sodium dodecylbenzenesulfonate, ammonium polyoxyethylene alkyl ether sulfate, and sodium polyoxyethylene alkyl phenyl ether sulfate; and nonionic emulsifiers such as polyoxyethylene alkyl ether, polyoxyethylene alkyl phenyl ether, polyoxyethylene fatty acid ester, and polyoxyethylene-polyoxypropylene block polymers. These emulsifiers may be used alone or in combination of two or more.

The emulsifier may be a reactive emulsifier. Examples of such an emulsifier having an introduced radically-polymerizable functional group such as a propenyl group or an allyl ether group, include AQUALON HS-10, HS-20, KH-10, BC-05, BC-10, and BC-20 (all manufactured by DAI-ICHI KOGYO SEIYAKU CO., LTD.) and ADEKA REASOAP SE10N (manufactured by ADEKA CORPORATION). The reactive emulsifier is preferred, because after polymerization, it can improve water resistance by being incorporated in the polymer chain. Based on 100 parts by weight of all monomers, the emulsifier is preferably used in an amount of 0.3 to 5 parts by weight, more preferably 0.5 to 1 part by weight, in view of polymerization stability or mechanical stability.

A hundred parts by weight of the resulting (meth)acryl-based polymer may be mixed with 10 to 200 parts by weight of a monomer different in composition from the polymer, and, if necessary, a solvent may be prepared. The mixture may be subjected to a graft polymerization reaction using 0.02 to 5 parts by weight of a peroxide, so that the physical properties can be adjusted.

In this process, the monomer different in composition may be, but not limited to, any of various (meth)acrylic monomers, and is preferably a monomer that only makes up at most 10% by weight or less of the backbone polymer structure; styrene or a styrene derivative such as α-styrene; or vinyltoluene or a derivative such as α-vinyltoluene.

Any graft polymerization method known to those skilled in the art may be used. For example, when solution polymerization is performed, a graft polymerization method may include adding a monomer to be graft-polymerized and a solvent for adjustment of viscosity to a solution of the acryl-based polymer after the reaction to form the backbone structure, replacing the air with nitrogen gas, then adding 0.02 to 5 parts by weight of a peroxide, and heating the mixture at 50° C. to 80° C. for 4 to 15 hours.

When emulsion polymerization is performed, a graft polymerization method may include adding water for adjustment of the solids content to an aqueous dispersion of the acryl-based polymer for forming the backbone, further adding a necessary monomer, replacing the air with nitrogen gas under stirring, allowing the acryl-based polymer particles to absorb the monomer to be graft-polymerized, then adding an aqueous solution of a water-soluble peroxide, and heating the mixture at 50 to 80° C. for 4 to 15 hours.

When a monomer is polymerized in the presence of the acryl-based polymer as described above, graft polymerization occurs, although a homopolymer of the monomer is also produced. The homopolymer of the monomer subjected to the graft polymerization is uniformly present in the acryl-based polymer.

If the amount of the peroxide used as an initiator in the process of graft polymerization is too small, it may take a long time to perform the graft polymerization. If the amount of the peroxide is too large, the amount of the homopolymer may be undesirably increased.

The resulting graft polymer has good heat resistance. Particularly when the backbone polymer has a hydroxyl group-containing acrylic monomer component, the position at which hydrogen is withdrawn and the compatibility of the graft polymer or the produced homopolymer are involved in a complex manner so that higher heat resistance is provided.

In the invention, the acryl-based polymer as a normal polymer or as a component forming the backbone of the graft polymer preferably has a glass transition temperature of 250 K or less. Using such a polymer, an adhesive composition with good heat resistance can be finally obtained. In addition, the polymer moiety that forms the branch of the graft polymer preferably has a glass transition temperature of 300 K or more.

The adhesive composition of the invention contains 100 parts by weight of the (meth)acryl-based polymer described above, 120 to 400 parts by weight of an aromatic polymer having a weight average molecular weight of from 200 to 900 as determined by gel permeation chromatography, and 150 to 600 parts by weight of titanium-based nanoparticles having an average particle size of 100 nm or less, preferably having an average particle size of 5 to 100 nm.

Examples of monomers that may be used to form the aromatic polymer include aromatic ring-containing monomers having an aromatic ring and an unsaturated double bond-containing polymerizable functional group such as a (meth)acryloyl group or a vinyl group. Examples of aromatic ring-containing monomers include phenoxyethyl (meth)acrylate, benzyl (meth)acrylate, phenol ethylene oxide-modified (meth)acrylate, 2-naphthethyl (meth)acrylate, 2-(4-methoxy-1-naphthoxy)ethyl (meth)acrylate, phenoxypropyl (meth) acrylate, phenoxydiethylene glycol (meth)acrylate, and polystyryl (meth)acrylate. Besides the above, styrene, a styrene derivative such as α-methylstyrene, vinyltoluene, or α-vinyltoluene may also be used.

The weight average molecular weight of the aromatic polymer is from 200 to 900, preferably from 300 to 800. If the molecular weight is more than 900, tackiness may be lost. If the molecular weight is less than 200, the polymer may fail to be effective in stabilizing the dispersion of the titanium-based nanoparticles.

Such a low-molecular-weight polymer can be synthesized using any appropriate method such as a method of adjusting the molecular weight using mercaptan or an α-methyl styrene dimer in normal radical polymerization, a living radical polymerization method using a polymerization initiator in the presence of a transition metal and a ligand, or an anionic polymerization method.

The content of the low-molecular-weight aromatic polymer is from 120 to 400 parts by weight, preferably from 150 to 350 parts by weight, based on 100 parts by weight of the (meth)acryl-based polymer. If the content is less than the lower limit, tackiness may be lower, and if the content is too high, the physical properties of the (meth)acryl-based polymer may be undesirably changed.

The adhesive composition of the invention contains titanium-based nanoparticles. The titanium-based nanoparticles may be titanium-containing nanoparticles, examples of which include nanoparticles of titanium oxide, barium titanate, zirconium titanate, strontium titanate, aluminum titanate, potassium titanate, lithium titanate, calcium titanate, magnesium titanate, lead titanate, titanium nitride, and any combination thereof.

The titanium-based nanoparticles may be in the shape of spheres, rectangular parallelepipeds, or other shapes such as bulky shapes, needles, or plates.

The titanium-based nanoparticles have an average particle size of 5 to 100 nm, preferably 5 to 50 nm, and more preferably 5 to 20 nm. The needle- or plate-shaped nanoparticles should have a maximum length of 5 to 100 nm, preferably 5 to 50 nm, and more preferably 5 to 20 nm. The average particle size is determined by a dynamic light scattering method using Zetasizer NANO ZS manufactured by Malvern Instruments Ltd, and the number average particle size is presented.

The nanoparticles may be optionally stabilized by treating their surfaces with a dispersion stabilizer such as a silane coupling agent.

Examples of the dispersion stabilizer include a silane coupling agent such as octylmethoxysilane, γ-mercaptopropyltrimethoxysilane, γ-methacryloxypropyltrimethoxysilane, γ-glycidoxypropyltrimethoxysilane, or vinyltrimethoxysilane; and silicone compounds modified with various organic substances including long-chain fatty acids such as lauric acid and oleic acid.

The dispersion stabilizers may be used alone or in combination of two or more. The amount of the dispersion stabilizer required to entirely treat the titanium-based nanoparticles should be from 1 to 100 parts by weight, based on 100 parts by weight of the titanium-based nanoparticles.

The content of the titanium-based nanoparticles is from 150 to 600 parts by weight, and preferably from 200 to 550 parts by weight, based on 100 parts by weight of the (meth)acryl-based polymer.

If the content is less than the lower limit, the desired refractive index cannot be attained. If the content is too high, it may be difficult to form the adhesive layer, which is not preferred.

The ratio of the content of the titanium-based nanoparticles to the content of the aromatic polymer (titanium-based nanoparticles/aromatic polymer) may be from 1.0 to 2.0, and preferably from 1.2 to 1.8. If the upper limit of the ratio is 2.0, the adhesive layer can be formed smoothly, and if the lower limit is 1.0, the refractive index of the adhesive layer can be effectively increased.

The pressure-sensitive adhesive composition of the invention may further contain a crosslinking agent such as an isocyanate crosslinking agent, an epoxy crosslinking agent, an oxazoline crosslinking agent, or a peroxide. Particularly in the invention, an isocyanate crosslinking agent or a peroxide crosslinking agent or a combination thereof is preferably used.

The isocyanate crosslinking agent for use as a crosslinking agent is intended to include a compound having two or more isocyanate groups (including an isocyanate-regenerating functional group produced by temporary protection of an isocyanate group with a blocking agent or by oligomerization of an isocyanate group, or the like) per molecule.

Examples of the isocyanate crosslinking agent include aromatic isocyanates such as tolylene diisocyanate and xylene diisocyanate, alicyclic isocyanates such as isophorone diisocyanate, and aliphatic isocyanates such as hexamethylene diisocyanate.

More specifically, examples of the isocyanate crosslinking agent include lower aliphatic polyisocyanates such as butylene diisocyanate and hexamethylene diisocyanate; alicyclic isocyanates such as cyclopentylene diisocyanate, cyclohexylene diisocyanate and isophorone diisocyanate; aromatic diisocyanates such as 2,4-tolylene diisocyanate, 4,4'-diphenylmethane diisocyanate, xylylene diisocyanate, and polymethylene polyphenyl isocyanate; isocyanate adducts such as a trimethylolpropane-tolylene diisocyanate trimer adduct (Coronate L (trade name) manufactured by NIPPON POLYURETHANE INDUSTRY CO., LTD.), a trimethylolpropane-hexamethylene diisocyanate trimer adduct (CORONATE HL (trade name) manufactured by NIPPON POLYURETHANE INDUSTRY CO., LTD.) and an isocyanurate of hexamethylene diisocyanate (CORONATE HX (trade name) manufactured by NIPPON POLYURETHANE INDUSTRY CO., LTD.); polyether polyisocyanates and polyester polyisocyanates; adducts thereof with various polyols; and polyisocyanates polyfunctionalized with an isocyanurate bond, a biuret bond, an allophanate bond, or the like. In particular, aliphatic isocyanates are preferably used, because of their high reaction speed.

One of the isocyanate crosslinking agents may be used alone, or two or more of the isocyanate crosslinking agents may be used in combination. The total content of the isocyanate compound crosslinking agent(s) is preferably from 0.01 to 2 parts by weight, more preferably from 0.05 to 1 part by weight, based on 100 parts by weight of the (meth)acrylic polymer. The content may be appropriately determined taking into account cohesive strength, prevention of delamination in a durability test, or the like.

When an aqueous dispersion of a modified acrylic polymer produced by emulsion polymerization is used, the isocyanate crosslinking agent does not have to be used. If necessary, a blocked isocyanate crosslinking agent may also be used, because the isocyanate crosslinking agent itself is susceptible to reacting with water.

Any peroxide crosslinking agent capable of producing active radical species by heating and promoting the crosslinking of the base polymer in the pressure-sensitive adhesive composition may be appropriately used. In view of workability or stability, a peroxide with a one-minute half-life temperature of 80° C. to 160° C. is preferably used, and a peroxide with a one-minute half-life temperature of 90° C. to 140° C. is more preferably used.

Examples of peroxides that may be used include di(2-ethylhexyl)peroxydicarbonate (one-minute half-life temperature: 90.6° C.), di(4-tert-butylcyclohexyl)peroxydicarbonate (one-minute half-life temperature: 92.1° C.), di-sec-butyl peroxydicarbonate (one-minute half-life temperature: 92.4° C.), tert-butyl peroxyneodecanoate (one-minute half-life temperature: 103.5° C.), tert-hexyl peroxypivalate (one-minute half-life temperature: 109.1° C.), tert-butyl peroxypivalate (one-minute half-life temperature: 110.3° C.), dilauroyl peroxide (one-minute half-life temperature: 116.4° C.), di-n-octanoylperoxide (one-minute half-life temperature: 117.4° C.), 1,1,3,3-tetramethylbutylperoxy-2-ethyl hexanoate (one-minute half-life temperature: 124.3° C.), di(4-methylbenzoyl) peroxide (one-minute half-life temperature: 128.2° C.), dibenzoyl peroxide (one-minute half-life temperature: 130.0° C.), tert-butyl peroxyisobutylate (one-minute half-life temperature: 136.1° C.), and 1,1-di(tert-hexylperoxy)cyclohexane (one-minute half-life temperature: 149.2° C.). In particular, di(4-tert-butylcyclohexyl) peroxydicarbonate (one-minute half-life temperature: 92.1° C.), dilauroyl peroxide (one-minute half-life temperature: 116.4° C.), dibenzoyl peroxide (one-minute half-life temperature: 130.0° C.), or the like is preferably used, because they can provide high crosslinking reaction efficiency.

The half life of the peroxide is an indicator of how fast the peroxide can be decomposed and refers to the time required for the remaining amount of the peroxide to reach one half of the original amount. The decomposition temperature required for a certain half life and the half life time obtained at a certain temperature are shown in catalogs furnished by manufacturers, such as "Organic Peroxide Catalog, 9th Edition, May, 2003" furnished by NOF CORPORATION.

One of the peroxides may be used alone, or two or more of the peroxides may be used in combination. The total content of the peroxide(s) should be from 0.02 to 2 parts by weight, preferably from 0.05 to 1 part by weight, based on 100 parts by weight of the (meth)acrylic polymer. The content may be appropriately selected within this range so that workability, re-workability, crosslink stability, peelability, or the like can be controlled.

The amount of decomposition of the peroxide may be determined by measuring the peroxide residue after the reaction process by high performance liquid chromatography (HPLC).

More specifically, for example, after the reaction process, about 0.2 g of each pressure-sensitive adhesive composition is taken out and immersed in 10 ml of ethyl acetate and subjected to shaking extraction at 25° C. and 120 rpm for 3 hours in a shaker and then allowed to stand at room temperature for 3 days. Thereafter, 10 ml of acetonitrile is added, and the mixture is shaken at 25° C. and 120 rpm. for 30 minutes. About 10 μl of the liquid extract obtained by filtration through a membrane filter (0.45 μm) is subjected to HPLC by injection and analyzed so that the amount of the peroxide after the reaction process is determined.

An organic crosslinking agent or a polyfunctional metal chelate may also be used together as the crosslinking agent. The organic crosslinking agent may be an epoxy crosslinking agent (which is intended to include a compound having two or more epoxy groups per molecule). Examples of such an epoxy crosslinking agent include ethylene glycol diglycidyl ether, propylene glycol diglycidyl ether, terephthalic acid diglycidyl ester acrylate, and spiroglycol diglycidyl ether. These may be used alone or in combination of two or more thereof.

The polyfunctional metal chelate is composed of an organic compound and a polyvalent metal that is covalently or coordinately bonded to the organic compound. Examples of the polyvalent metal atom include Al, Cr, Zr, Co, Cu, Fe, Ni, V, Zn, In, Ca, Mg, Mn, Y, Ce, Sr, Ba, Mo, La, Sn, and Ti. The organic compound has a covalent or coordinate bond-forming atom such as an oxygen atom. Examples of the organic compound include alkyl esters, alcohol compounds, carboxylic acid compounds, ether compounds, and ketone compounds.

With the use of such crosslinking agents, the pressure-sensitive adhesive layer is formed. Upon forming of the pressure-sensitive layer, the amount of such crosslinking agent, the effect of the temperature and the time of crosslinking should be fully considered.

In the production of the adhesive layer, the amount of the addition of the crosslinking agent is preferably adjusted in such a manner that the crosslinked adhesive layer has a gel fraction of 40 to 90% by weight, and more preferably 50 to 85% by weight. To achieve such a gel fraction, a peroxide crosslinking agent and an isocyanate crosslinking agent are preferably used alone or in combination. If the gel fraction is low, cohesive strength may be low, and if it is too high, adhesive power may be low. The degree of crosslinking is more preferably such that the gel fraction is determined to be from 10 to 75% when a peroxide is used alone.

The gel fraction can be adjusted to a predetermined value by adjusting the amount of the addition of an isocyanate crosslinking agent or any other crosslinking agent and setting crosslinking conditions such as temperature and time.

Specifically, when a peroxide is used, the crosslinking temperature and time should be set so that 50% or more, preferably 60% or more of the peroxide will be decomposed.

If the degree of decomposition of the peroxide is low, a large part of the peroxide will remain, which is not preferred because the crosslinking reaction can occur over time.

More preferably, for example, if the crosslinking temperature corresponds to the one-minute half-life temperature, the degree of decomposition will be 50% after 1 minute and 75% after 2 minutes, which means that the heat treatment should be performed for 1 minute or more. If the peroxide has a half-life time of 30 seconds at the crosslinking temperature, the crosslinking treatment should be performed for 30 seconds or more. If the peroxide has a half-life time of minutes at the crosslinking temperature, the crosslinking treatment should be performed for 5 minutes or more.

As described above, the crosslinking temperature and time, which depend on the peroxide to be used, can be adjusted by proportional calculation from its half-life time, assuming that the degree of decomposition of the peroxide is linearly proportional to time. It should be noted that the heat treatment should be performed at a temperature of up to 170° C. in order to avoid any side reaction. It will be understood that the temperature during drying may be directly used for the heat treatment or the heat treatment may be performed after drying. The treatment time may be from 0.2 to 20 minutes, and preferably from 0.5 to 10 minutes, which is determined taking into account productivity or workability.

The pressure-sensitive adhesive obtained as described above is characterized in that it shows only a very small rise in adhesive force after bonded to the adherend and that it is easily removable with no adhesive residue even after bonded for a long time.

The adhesive layer preferably has a haze of 20% or less particularly when it is used on an optical component. If the haze is more than 20%, a laminate of an optical component and the adhesive layer may have a significantly reduced transmittance, which is not preferred. The haze of the adhesive layer of the invention is typically, but not limited to, 20% or less. A haze of 20% or less means that the resulting adhesive layer is not cloudy even though it contains titanium-based nanoparticles and that the titanium-based nanoparticles are uniformly dispersed. Thus, the pressure-sensitive adhesive of the invention does not increase in haze and hardly decreases in transmittance.

Some optical films and optical components being used now have relatively high refractive indices. For example, when a pressure-sensitive adhesive is used to bond a brightness enhancement film to a polycarbonate material with a refractive index of about 1.60, the adhesive layer should preferably have a refractive index of about 1.60 or more. An adhesive layer with a refractive index of less than 1.60 may degrade the properties of the component or the film. The adhesive layer of the invention also preferably has a refractive index in such a range.

An adhesive sheet having the adhesive composition or adhesive layer of the invention can be bonded to a hydrophilic material such as glass. In this case, the composition may contain 0.01 to 1 part by weight, preferably 0.02 to 0.6 parts by weight of a silane coupling agent for improving water resistance at the interface, based on 100 parts by weight of the acryl-based polymer. If the amount of the silane coupling agent is too large, the adhesive may have high adhesive force to a liquid crystal cell so that its removability may be low, and if the amount of the silane coupling agent is too small, durability may be undesirably lowered.

Examples of silane coupling agents that can be preferably used include epoxy group-containing silane coupling agents such as 3-glycidoxypropyltrimethoxysilane, 3-glycidoxypropyltriethoxysilane, 3-glycidoxypropylmethyldiethoxysilane, and 2-(3,4-epoxycyclohexyl)ethyltrimethoxysilane; amino group-containing silane coupling agents such as 3-aminopropyltrimethoxysilane, N-(2-aminoethyl)-3-aminopropylmethyldimethoxysilane, 3-triethoxysilyl-N-(1, 3-dimethylbutylidene)propylamine, and N-phenyl-γ-aminopropyltrimethoxysilane; (meth)acrylic group-containing silane coupling agents such as 3-acryloxypropyltrimethoxysilane and 3-methacryloxypropyltriethoxysilane; and isocyanate group-containing silane coupling agents such as 3-isocyanatopropyltriethoxysilane.

The pressure-sensitive adhesive composition of the present invention may also contain any other known additive.

For example, a powder such as a colorant and a pigment, a dye, a surfactant, a plasticizer, a tackifier, a surface lubricant, a leveling agent, a softening agent, an antioxidant, an age resister, a light stabilizer, an ultraviolet absorbing agent, a polymerization inhibitor, an inorganic or organic filler, a metal powder, or a particle- or foil-shaped material may be added as appropriate depending on the intended use.

The pressure-sensitive sheet of the present invention includes an support such as optical member and a pressure-sensitive adhesive layer that is formed from the pressure-sensitive adhesive on at least one side of the optical member.

For example, the pressure-sensitive adhesive layer may be formed by a method that includes applying the pressure-sensitive adhesive composition to a release-treated separator or the like, removing polymerization solvents and so on by drying and curing the composition to form a pressure-sensitive adhesive layer, and then transferring the pressure-sensitive adhesive layer onto an optical film. Alternatively, the pressure-sensitive adhesive layer may be formed by a method that includes directly applying the pressure-sensitive adhesive composition to an optical film serving as the base material and removing polymerization solvents and so on by drying and curing the composition to form a pressure-sensitive adhesive layer on the optical film. Before the pressure-sensitive adhesive is applied, one or more optional solvents other than the polymerization solvents may be further added to the pressure-sensitive adhesive.

A silicone peeling off liner is preferably used as the release-treated separator. The adhesive composition of the invention may be applied to such a liner and dried to form a pressure-sensitive adhesive layer. In this process, any appropriate method may be used for drying the pressure-sensitive adhesive, depending on the purpose. A method of heating and drying the coating film is preferably used. The heating and drying temperature is preferably from 40° C. to 200° C., more preferably from 50° C. to 180° C., particularly preferably from 70° C. to 170° C. When the heating temperature is set within the range, a pressure-sensitive adhesive with a high level of adhesive properties can be obtained.

Any appropriate drying time may be used as needed. The drying time is preferably from 5 seconds to 20 minutes, more preferably from 5 seconds to 10 minutes, particularly preferably from 10 seconds to 5 minutes.

The surface of the optical member may also be coated with an anchor layer or subjected to any adhesion-facilitating treatment such as corona treatment or plasma treatment, before the pressure-sensitive adhesive layer is formed. The surface of the pressure-sensitive adhesive layer may also be subjected to adhesion-facilitating treatment.

Various methods may be used to form the pressure-sensitive adhesive layer. Examples of such methods include roll coating, kiss roll coating, gravure coating, reverse coating, roll brush coating, spray coating, dip roll coating, bar coating, knife coating, air knife coating, curtain coating, lip coating, and extrusion coating with a die coater or the like.

The thickness of the pressure-sensitive adhesive layer is not limited, but for example, from about 1 to 100 μm, preferably from 2 to 50 μm, more preferably from 2 to 40 μm, still more preferably from 5 to 35 μm.

When the pressure-sensitive adhesive layer is exposed, the pressure-sensitive adhesive layer may be protected with a sheet having undergone release treatment (a separator) before practical use.

Examples of the material for forming the separator include a plastic film such as a polyethylene, polypropylene, polyethylene terephthalate, or polyester film, a porous material such as paper, cloth and nonwoven fabric, and an appropriate thin material such as a net, a foamed sheet, a metal foil, and a laminate thereof. In particular, a plastic film is preferably used, because of its good surface smoothness.

The plastic film may be any film capable of protecting the pressure-sensitive adhesive layer, and examples thereof include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film.

The thickness of the separator is generally from about 5 to about 200 μm, preferably from about 5 to about 100 μm. If necessary, the separator may be treated with a release agent such as a silicone, fluorine, long-chain alkyl, or fatty acid amide release agent, or may be subjected to release and antifouling treatment with silica powder or to antistatic treatment of coating type, kneading and mixing type, vapor-deposition type, or the like. In particular, if the surface of the separator is appropriately subjected to release treatment such as silicone treatment, long-chain alkyl treatment, and fluorine treatment, the releasability from the pressure-sensitive adhesive layer can be further increased.

In the above production method, the release-treated sheet may be used without modification as a separator for the pressure-sensitive adhesive sheet, the pressure-sensitive adhesive optical member or the like, so that the process can be simplified.

The optical film may be of any type for use in forming image displays such as liquid crystal displays. For example, a polarizing plate is exemplified as the optical film. A polarizing plate including a polarizer and a transparent protective film provided on one or both sides of the polarizer is generally used.

A polarizer is not limited especially but various kinds of polarizer may be used.

As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine, is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

For example, a polarizing plate is exemplified as the optical film. A polarizing plate including a polarizer and a transparent protective film provided on one or both sides of the polarizer is generally used.

A thermoplastic resin with a high level of transparency, mechanical strength, thermal stability, moisture blocking properties, isotropy, and the like may be used as a material for forming the transparent protective film. Examples of such a thermoplastic resin include cellulose resins such as triacetylcellulose, polyester resins, polyethersulfone resins, polysulfone resins, polycarbonate resins, polyamide resins, polyimide resins, polyolefin resins, (meth)acrylic resins, cyclic olefin polymer resins (norbornene resins), polyarylate resins, polystyrene resins, polyvinyl alcohol resins, and any mixture thereof. The transparent protective film is generally laminated to one side of the polarizer with the adhesive layer, but thermosetting resins or ultraviolet curing resins such as (meth)acrylic, urethane, acrylic urethane, epoxy, or silicone resins may be used to other side of the polarizer for the transparent protective film. The transparent protective film may also contain at least one type of any appropriate additive. Examples of the additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, still more preferably from 60 to 98% by weight, particularly preferably from 70 to 97% by weight. If the content of the thermoplastic resin in the transparent protective film is 50% by weight or less, high transparency and other properties inherent in the thermoplastic resin can fail to be sufficiently exhibited.

Moreover, as is described in JP-A No. 2001-343529 (WO 01/37007), polymer films, for example, resin compositions including (A) thermoplastic resins having substituted and/or non-substituted imido group in sidechain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. Since the films are less in retardation and less in photoelastic coefficient, faults such as unevenness due to a strain in a polarizing plate can be removed and besides, since they are less in moisture permeability, they are excellent in durability under humidified environment.

Thickness of the transparent protective film can be properly determined and generally in the range of from about 1 to 500 μm from the viewpoint of a strength, workability such as handlability, requirement for a thin film and the like. Especially, the thickness is preferably in the range of from 1 to 300 μm and more preferably in the range of from 5 to 200 μm.

Therefore, it is particularly preferred that the transparent protective film has a thickness of 5 to 150 μm.

Note that in a case where the transparent protective films are provided on both sides of a polarizer, the protective films made from the same polymer may be used on both sides thereof or alternatively, the protective films made from polymer materials different from each other may also be used on respective both sides thereof.

At least one selected from a cellulose resin, a polycarbonate resin, a cyclic polyolefin resin, and a (meth)acrylic resin is preferably used for the transparent protective film according to the present invention.

The cellulose resin is an ester of cellulose and a fatty acid. Examples of such a cellulose ester resin include triacetyl cellulose, diacetyl cellulose, tripropionyl cellulose, dipropionyl cellulose, and the like. In particular, triacetyl cellulose is preferred. Much commercially available triacetyl celluloses are placing on sale and are advantageous in view of easy availability and cost. Examples of commercially available products of triacetyl cellulose include UV-50, UV-80, SH-80, TD-80U, TD-TAC, and UZ-TAC (trade names) manufactured by Fujifilm Corporation, and KC series manufactured by Konica Minolta. In general, these triacetyl cellulose products have a thickness direction retardation (Rth) of about 60 nm or less, while having an in-plane retardation (Re) of almost zero.

Cellulose resin films with relatively small thickness direction retardation may be obtained by processing any of the above cellulose resins. Examples of the processing method include a method that includes laminating a general cellulose-based film to a base film such as a polyethylene terephthalate, polypropylene, or stainless steel film, coated with a solvent such as cyclopentanone or methyl ethyl ketone, drying the laminate by heating (for example, at 80 to 150° C. for 3 to 10 minutes) and then separating the base film; and a method that includes coating a general cellulose resin film with a solution of a norbornene resin, a (meth)acrylic resin or the like in a solvent such as cyclopentanone or methyl ethyl ketone, drying the coated film by heating (for example, at 80 to 150° C. for 3 to 10 minutes), and then separating the coating.

The cellulose resin film with a relatively small thickness direction retardation to be used may be a fatty acid cellulose resin film with a controlled degree of fat substitution. While triacetyl cellulose for general use has a degree of acetic acid substitution of about 2.8, preferably, the degree of acetic acid substitution is controlled to 1.8 to 2.7, so that the Rth can be reduced. The Rth may also be controlled to be low by adding a plasticizer such as dibutyl phthalate, p-toluenesulfonanilide, and acetyl triethyl citrate, to the fatty acid-substituted cellulose resin. The plasticizer is preferably added in amount of 40 parts by weight or less, more preferably of 1 to 20 parts by weight, still more preferably of 1 to 15 parts by weight, to 100 parts by weight of the fatty acid cellulose resin.

For example, the cyclic polyolefin resin is preferably a norbornene resin. Cyclic olefin resin is a generic name for resins produced by polymerization of cyclic olefin used as a polymerizable unit, and examples thereof include the resins disclosed in JP-A Nos. 01-240517, 03-14882, and 03-122137. Specific examples thereof include ring-opened (co)polymers of cyclic olefins, addition polymers of cyclic olefins, copolymers (typically random copolymers) of cyclic olefins and α-olefins such as ethylene and propylene, graft polymers produced by modification thereof with unsaturated carboxylic acids or derivatives thereof, and hydrides thereof. Examples of the cyclic olefin include norbornene monomers.

Various commercially available cyclic polyolefin resins are placing on sale. Examples thereof include Zeonex (trade name) and Zeonor (trade name) series manufactured by Zeon Corporation, Arton (trade name) series manufactured by JSR Corporation, Topas (trade name) series manufactured by Ticona, and Apel (trade name) series manufactured by Mitsui Chemicals, Inc.

The (meth)acrylic resin preferably has a glass transition temperature (Tg) of 115° C. or more, more preferably of 120° C. or more, still more preferably of 125° C. or more, particularly preferably of 130° C. or more. If the Tg is 115° C. or more, the resulting polarizing plate can have good durability. The upper limit to the Tg of the (meth)acrylic resin is preferably, but not limited to, 170° C. or less, in view of formability and the like. The (meth)acrylic resin can form a film with an in-plane retardation (Re) of almost zero and a thickness direction retardation (Rth) of almost zero.

Any appropriate (meth)acrylic resin may be used as long as the advantages of the present invention are not reduced. Examples of such a (meth)acrylic resin include poly(meth)acrylate such as poly(methyl methacrylate), methyl methacrylate-(meth)acrylic acid copolymers, methyl methacrylate-(meth)acrylate copolymers, methyl methacrylate-acrylate-(meth)acrylic acid copolymers, methyl (meth)acrylate-styrene copolymers (such as MS resins), and alicyclic hydrocarbon group-containing polymers (such as methyl methacrylate-cyclohexyl methacrylate copolymers and methyl methacrylate-norbornyl (meth)acrylate copolymers). Poly(C1-6 alkyl (meth)acrylate) such as poly(methyl (meth)acrylate) is preferred. A methyl methacrylate-based resin mainly composed of a methyl methacrylate unit (50 to 100% by weight, preferably 70 to 100% by weight) is more preferred.

Examples of the (meth)acrylic resin include Acrypet VH and Acrypet VRL20A each manufactured by Mitsubishi Rayon Co., Ltd., (meth)acrylic resins having a ring structure in their molecule as disclosed in JP-A No. 2004-70296, and high-Tg (meth)acrylic resins produced by intramolecular crosslinking or intramolecular cyclization reaction.

Lactone ring structure-containing (meth)acrylic resins may also be used, because they have high heat resistance and high transparency and also have high mechanical strength after biaxially stretched.

Examples of the lactone ring structure-containing (meth)acrylic reins include the lactone ring structure-containing (meth)acrylic reins disclosed in JP-A Nos. 2000-230016, 2001-151814, 2002-120326, 2002-254544, and 2005-146084.

The lactone ring structure-containing (meth)acrylic reins preferably have a ring structure represented by Formula (I):

[Formula 1]

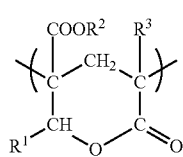

wherein $R^1$, $R^2$ and $R^3$ each independently represent a hydrogen atom or an organic residue of 1 to 20 carbon atoms. The organic residue may contain an oxygen atom(s).

The content of the lactone ring structure represented by Formula (I) in the lactone ring structure-containing (meth)acrylic resin is preferably from 5 to 90% by weight, more preferably from 10 to 70% by weight, still more preferably from 10 to 60% by weight, particularly preferably from 10 to 50% by weight. If the content of the lactone ring structure represented by Formula (I) in the lactone ring structure-containing (meth)acrylic resin is less than 5% by weight, its heat resistance, solvent resistance or surface hardness can be insufficient. If the content of the lactone ring structure represented by Formula (I) in the lactone ring structure-containing (meth)acrylic resin is more than 90% by weight, its formability or workability can be poor.

The lactone ring structure-containing (meth)acrylic resin preferably has a mass average molecular weight (also referred to as weight average molecular weight) of 1,000 to 2,000,000, more preferably of 5,000 to 1,000,000, still more preferably of 10,000 to 500,000, particularly preferably of 50,000 to 500,000. A mass average molecular weight outside the above range is not preferred in view of formability or workability.

The lactone ring structure-containing (meth)acrylic resin preferably has a Tg of 115° C. or more, more preferably of 120° C. or more, still more preferably of 125° C. or more, particularly preferably of 130° C. or more. For example, the resin with a Tg of 115° C. or more can produce good durability, when it is incorporated in the form of a transparent protective film in a polarizing plate. The upper limit to the Tg of the lactone ring structure-containing (meth)acrylic resin is preferably, but not limited to, 170° C. or less in view of formability and the like.

The total light transmittance of the lactone ring structure-containing (meth)acrylic resin, which may be measured according to ASTM-D-1003 with respect to injection molded products, is preferably as high as possible, and specifically, it is preferably 85% or more, more preferably 88% or more, still more preferably 90% or more. The total light transmittance is an index of transparency, and a total light transmittance of less than 85% can result in reduced transparency.

The transparent protective film may be subjected to surface modification treatment before it is applied with the adhesive to improve adhesiveness to polarizer. Specific examples of such treatment include corona treatment, plasma treatment, ozone treatment, flame treatment, primer treatment, glow treatment, saponification treatment, and coupling agent treatment.

A hard coat layer may be prepared, or antireflection processing, processing aiming at sticking prevention, diffusion or anti glare may be performed onto the face on which the polarizing film of the above described transparent protective film has not been adhered.

Further an optical film of the present invention may be used as other optical layers, such as a reflective plate, a anti-transflective plate, a retardation plate (a half wavelength plate and a quarter wavelength plate included), and a viewing angle compensation film, which may be used for formation of a liquid crystal display etc. These are used in practice as an optical film, or as one layer or two layers or more of optical layers laminated with polarizing plate.

In a non-limiting aspect, the adhesive sheet of the invention is preferably used to form various image display devices such as liquid crystal display devices. Liquid crystal display devices may be formed according to conventional techniques. Specifically, a liquid crystal display device may be typically formed using any conventional technique including properly assembling a liquid crystal cell, an adhesive sheet, and optional components such as lighting system components, and incorporating a driving circuit, except that the adhesive sheet used is according to the invention. The liquid crystal cell to be used may also be of any type such as TN type, STN type, n type, VA type, or IPS type.

Any desired liquid crystal display device may be formed, such as a liquid crystal display device including a liquid crystal cell and the adhesive sheet or sheets placed on one or both sides of the liquid crystal cell or a liquid crystal display device further including a backlight or a reflector in a lighting system. In such a case, the optical film or films according to the invention may be placed on one or both sides of the liquid crystal cell. When the optical films are provided on both sides, they may be the same or different. The process of forming a liquid crystal display device may also include placing an appropriate component such as a diffusion plate, an antiglare layer, an anti-reflection film, a protective plate, a prism array, a lens array sheet, a light diffusion plate, or a backlight in one or more layers at an appropriate position or positions.

EXAMPLES

Hereinafter, the invention is more specifically described with reference to the examples, which however are not intended to limit the invention. In each example, "parts" and "%" are all by weight. Unless otherwise specified below, the conditions of allowing to stand at room temperature are 23° C. and 65% RH (for 1 hour or 1 week) in all cases. The evaluation items in the examples and so on were measured as described below.

<Measurement of Weight Average Molecular Weight>

The weight average molecular weight of the resulting (meth)acryl-based polymer was measured by gel permeation chromatography (GPC). The sample was dissolved in tetrahydrofuran to form a 0.1% by weight solution. The solution was allowed to stand overnight and then filtered through a 0.45-μm membrane filter. The resulting filtrate was used in the measurement.

Analyzer: HLC-8120GPC manufactured by TOSOH CORPORATION Columns for analysis of (meth)acryl-based polymers:
GM7000H$_{XL}$+GMH$_{XL}$+GMH$_{XL}$ manufactured by TOSOH CORPORATION Columns for analysis of aromatic polymers:
G3000HXL+2000HXL+G1000HXL
Column size: each 7.8 mmϕ×30 cm, 90 cm in total
Eluent: tetrahydrofuran (a concentration of 0.1% by weight)
Flow rate: 0.8 ml/minute
Inlet pressure: 1.6 MPa
Detector: differential refractometer (RI)
Column temperature: 40° C.
  Injection volume: 100 μl
  Eluent: tetrahydrofuran
  Detector: differential refractometer
  Standard sample: polystyrene
  <Measurement of Gel Fraction>

The dried and crosslinked pressure-sensitive adhesive (with an initial weight W1) was immersed and stored in an ethyl acetate solution at room temperature for 1 week. The insoluble matter was then taken out and measured for dry weight (W2). The gel fraction was calculated from the formula:

Gel fraction=($W2/W1$)×100.

Example 1

(Preparation of Acryl-Based Polymer)

To a four-neck flask equipped with a stirring blade, a thermometer, a nitrogen gas introducing tube, and a condenser were added 100 parts by weight of n-butyl acrylate, 1 part by weight of 4-hydroxybutyl acrylate, 0.1 parts by weight of 2,2'-azobisisobutyronitrile as a polymerization initiator, 100 parts by weight of ethyl acetate, and 100 parts by weight of toluene. Nitrogen gas was introduced for 1 hour to replace the air while the mixture was gently stirred. Subsequently, the mixture was subjected to a polymerization reaction for 15 hours while the temperature of the liquid in the flask was kept at about 55° C., so that a solution of an acryl-based polymer with a weight average molecular weight of 600,000 was obtained.

Fifteen parts by weight of a silicone compound (KR-9706 manufactured by Shin-Etsu Chemical Co., Ltd.) was added to 100 parts by weight of titanium oxide (TTO-51C manufactured by ISHIHARA SANGYO KAISHA, LTD.). In a bead mill (ULTRA APEX MILL manufactured by KOTOBUKI INDUSTRIES CO., LTD.), the mixture was treated with 460 parts by weight of methyl ethyl ketone as a dispersion medium for 2 hours, so that a 40 nm titania dispersion was obtained.

Based on 100 parts by weight of the polymer solid in the resulting pressure-sensitive adhesive polymer solution, 500 parts by weight (solid basis) of the titania dispersion and 300 parts by weight (solid basis) of a low-molecular-weight styrene polymer (Mw 350, Piccolastic A5 manufactured by Eastman Chemical Company) dissolved in toluene were added to the pressure-sensitive adhesive polymer solution, and 0.5 parts by weight of benzoyl peroxide was further added. Subsequently, the resulting composition was applied to one side of a 38-µm-thick, silicone-treated, polyethylene terephthalate (PET) film (DIAFOIL MRF38 manufactured by Mitsubishi Chemical Polyester Co., Ltd.) so that a 20-µm-thick, adhesive layer could be formed after drying. The composition was then dried at 150° C. for 3 minutes to form an adhesive layer, so that an adhesive sheet was obtained.

Example 2

(Preparation of Acryl-Based Polymer)

In Example 2, an adhesive sheet was obtained by the same procedure as in Example 1, except that the amount of the low-molecular-weight styrene polymer was changed to 200 parts by weight (solid basis) and that the amount of the titania nanoparticles was changed to 300 parts by weight (solid basis).

Comparative Example 1

In Comparative Example 1, an adhesive sheet was obtained by the same procedure as in Example 1, except that the amount of the low-molecular-weight styrene polymer was changed to 60 parts by weight (solid basis) and that the amount of the titania nanoparticles was changed to 60 parts by weight (solid basis).

Comparative Example 2

In Comparative Example 2, an adhesive sheet was obtained by the same procedure as in Example 2, except that the low-molecular-weight styrene polymer was changed to Crystalex 3085 (Mw 950, manufactured by Eastman Chemical Company).

Comparative Example 3

In Comparative Example 3, an adhesive sheet was obtained by the same procedure as in Example 2, except that the low-molecular-weight styrene polymer was changed to Picotex LC (Mw 1,110, manufactured by Rika Fine-Tech Inc.).

Comparative Example 4

In Comparative Example 4, an adhesive sheet was obtained by the same procedure as in Example 2, except that the low-molecular-weight styrene polymer was changed to Crystalex 1120 (Mw 2,250, manufactured by Eastman Chemical Company).

The adhesive sheets (samples) obtained in the examples and the comparative examples were evaluated as described below. The results of the evaluation are shown in Table 1.

<Adhesive Force>

The sample obtained in each of the examples and the comparative examples was cut into an about 100-mm-long, 20-mm-wide piece. The sample piece was bonded to a 0.5-mm-thick, non-alkali glass plate (1737 manufactured by Corning Incorporated) with a 2 kg roller reciprocating once. The sample piece was then autoclaved at 50° C. and 0.5 MPa for 30 minutes, so that it was completely bonded. Subsequently, the peel strength of the sample piece was measured at a peel angle of 90° and a peel rate of 300 mm/minute.

<Refractive Index>

The refractive index of the sample obtained in each of the examples and the comparative examples was measured with an Abbe refractometer (DR-M2 manufactured by ATAGO CO., LTD.) in a 25° C. atmosphere while sodium D line was applied to the sample.

<Haze>

A 10-mm-wide sample piece of the adhesive sheet obtained in each of the examples and the comparative examples was used. The haze of the sample piece was measured at an atmospheric temperature of 25° C. with a reflectance/transmittance meter HR-100 manufactured by MURAKAMI COLOR RESEARCH LABORATORY using D-65 light according to JIS K 7136.

TABLE 1

| | Haze (%) | Thickness (µm) | Refractive index ($n_p$) | Adhesive force (N/20 mm) | Styrene-based, low-molecular-weight polymer (Mw) |
|---|---|---|---|---|---|
| Example 1 | 5.8 | 20 | 1.70 | 15.3 | 350 |
| Example 2 | 6.8 | 20 | 1.67 | 14.0 | 350 |
| Comparative Example 1 | 6.8 | 20 | 1.56 | 8.4 | 350 |
| Comparative Example 2 | 14.5 | 20 | 1.67 | * | 950 |
| Comparative Example 3 | 11.6 | 20 | 1.67 | * | 1110 |
| Comparative Example 4 | 6.2 | 20 | 1.67 | * | 2250 |

*: The measurement was impossible because of lack of tackiness.

The invention claimed is:

1. An adhesive composition, comprising:
   100 parts by weight of a (meth)acryl-based polymer comprising, as a monomer component, 50% by weight or more of a (meth)acrylate represented by the formula $CH_2=C(R_1)COOR_2$, wherein $R_1$ represents hydrogen or a methyl group, and $R_2$ represents a substituted or unsubstituted alkyl group of 1 to 20 carbon atoms, having a weight average molecular weight of from 500,000 to 3,000,000 as determined by gel permeation chromatography, and being substantially free of an acid component;
   120 to 400 parts by weight of an aromatic polymer comprising an aromatic ring-containing monomer having an unsaturated double bond-containing polymerizable functional group and an aromatic ring, the aromatic polymer having a weight average molecular weight of from 200 to 900 as determined by gel permeation chromatography; and 150 to 600 parts by weight of titanium-based nanoparticles having an average particle size of 40 to 100 nm.

2. The adhesive composition according to claim 1, wherein the (meth)acryl-based polymer is a copolymer further comprising 0.05 to 10% by weight of a unit derived from a hydroxyl group-containing (meth)acrylate represented by the formula $CH_2=C(R_1)COOC_nH_{2n}OH$, wherein $R_1$ represents hydrogen or a methyl group, and n represents an integer of 1 to 10.

3. The adhesive composition according to claim 1, further comprising 0.02 to 2 parts by weight of a crosslinking agent, based on 100 parts by weight of the (meth)acryl-based polymer.

4. The adhesive composition according to claim 1, wherein the (meth)acryl-based polymer is a graft polymer having a backbone-forming main chain and a side chain different in composition from the backbone-forming main chain.

5. An adhesive layer, comprising a product made from the adhesive composition according to claim 1.

6. The adhesive layer according to claim 5, which has a gel fraction of 40 to 90% by weight.

7. The adhesive layer according to claim 5, which has a haze of 20% or less.

8. An adhesive sheet, comprising a support and the adhesive layer according to claim 5 formed on at least one side of the support.

* * * * *